US010213959B2

United States Patent
McMahon et al.

(10) Patent No.: US 10,213,959 B2
(45) Date of Patent: Feb. 26, 2019

(54) METHOD FOR REMOVING SUBSTRATE MATERIAL, FOR WASHING, AND FOR DRYING PARTS PRODUCED BY A 3-D PRINTER

(71) Applicant: Audubon Machinery Corp., North Tonawanda, NY (US)

(72) Inventors: Joseph M. McMahon, North Tonawanda, NY (US); Scott Alexander Gilmour, Amherst, NY (US); Adam Michael Moehlau, Cheektowaga, NY (US); Joshua J. Yagy, Buffalo, NY (US); Daniel J. Hutchinson, Lancaster, NY (US)

(73) Assignee: Audubon Machinery Corp., North Tonawanda, NY (US)

( * ) Notice: Subject to any disclaimer, the term of this patent is extended or adjusted under 35 U.S.C. 154(b) by 0 days.

(21) Appl. No.: 15/983,775

(22) Filed: May 18, 2018

(65) Prior Publication Data
US 2018/0264729 A1 Sep. 20, 2018

Related U.S. Application Data

(62) Division of application No. 15/184,709, filed on Jun. 16, 2016, now Pat. No. 10,112,344.

(60) Provisional application No. 62/180,476, filed on Jun. 16, 2015.

(51) Int. Cl.
| | | |
|---|---|---|
| *B29C 64/35* | (2017.01) | |
| *B29C 64/129* | (2017.01) | |
| *B29C 64/20* | (2017.01) | |
| *B33Y 10/00* | (2015.01) | |
| *B33Y 30/00* | (2015.01) | |
| *B08B 3/00* | (2006.01) | |
| *B33Y 40/00* | (2015.01) | |

(52) U.S. Cl.
CPC ............... *B29C 64/35* (2017.08); *B08B 3/00* (2013.01); *B29C 64/20* (2017.08); *B33Y 40/00* (2014.12)

(58) Field of Classification Search
CPC ... B29C 67/007; B29C 67/0096; B29C 64/35; B29C 64/40; B29C 71/0009; B29C 67/00; B33Y 10/00; B33Y 30/00; B33Y 40/00; B08B 3/104; B08B 3/024; B08B 3/044; B08B 3/08; B08B 3/10; B08B 3/12; B08B 3/14; B08B 3/02
USPC .................................. 264/442; 134/34, 15, 1
See application file for complete search history.

(56) References Cited

U.S. PATENT DOCUMENTS

2009/0241997 A1* 10/2009 Tafoya ................... B08B 3/045
134/34

* cited by examiner

*Primary Examiner* — Matthew J Daniels
*Assistant Examiner* — Yunju Kim
(74) *Attorney, Agent, or Firm* — Phillips Lytle LLP; David L. Principe

(57) ABSTRACT

A method for removing substrate material from a part produced by a 3-D printer. The method includes providing a housing having a working chamber defined therein. The method further includes providing a spray header disposed along at least a portion of the perimeter of the working chamber. A pump is configured and arranged to convey a fluid at varying pressures through the spray header. Fluid contacts a part inserted into the working chamber and then flows to the bottom of the working chamber to a fluid outlet.

20 Claims, 7 Drawing Sheets

METHOD FOR REMOVING SUBSTRATE MATERIAL, FOR WASHING, AND FOR DRYING PARTS PRODUCED BY A 3-D PRINTER

CROSS-REFERENCE TO RELATED APPLICATION

The present application is a divisional of U.S. patent application Ser. No. 15/184,709 filed Jun. 16, 2016, entitled "Machine for Removing Substrate Material, for Washing, and for Drying Parts Produced by a 3-D Printer," which claims priority benefit of U.S. Provisional Patent Application No. 62/180,476 filed Jun. 16, 2015, entitled "Machine for Removing Substrate Material, for Washing, and for Drying Parts Produced by a 3-D Printer," both of which are incorporated herein by reference.

TECHNICAL FIELD

The present invention relates generally to the field of 3-D printers, and more particularly to a machine for processing parts formed by 3-D printers.

BACKGROUND ART

A part produced by a 3-D printer may include a scaffolding and/or substrate attached to the part after the printing process is completed. A finishing process may be required to remove the scaffolding/substrate from the part. Also, parts produced by a 3-D printer may need to be washed and dried.

BRIEF SUMMARY OF THE INVENTION

With parenthetical reference to corresponding parts, portions or surfaces of the disclosed embodiment, merely for the purposes of illustration and not by way of limitation, the present invention provides an improved machine (10) for processing a part produced by a 3-D printer. The machine (10) includes a housing (13) having a working chamber (16) defined therein.

A support structure (19) disposed at the bottom of the working chamber (16) supports the 3-D printed part. The structure (19) has at least one opening defined therein. A spray header (31) is disposed along at least a portion of the perimeter of the working chamber (16). A pump (60) is configured and arranged to convey a fluid at varying pressures through the spray header (31). The fluid from the spray header (31) contacts the part and then passes through the opening in the structure (19) where it flows into a sump (45) below the working chamber (16) which has a fluid outlet (47).

The spray header (31) may comprise an assembly of vertical and horizontal tubes (34, 37) having apertures defined therein.

The spray header (31) may be disposed around the perimeter of the working chamber (16).

The spray header (31) may oscillate inside the working chamber in the Z-axis direction.

The machine (10) may also include a heater (65) having heating elements or a coil for heating the fluids conveyed into the working chamber (16) through the spray header (31). The heater (65) may heat the fluid to a temperature up to about 180 degrees Fahrenheit.

The machine (10) may further comprise a dryer for drying the part.

A portion of the spray header (31) may be disposed beneath the support structure (19) to provide for spraying fluid onto the bottom surface of the part. The support structure (19) may have an open lattice-type structure.

The pump (60) may be configured to convey fluids at a variety of pressures from low pressure range from zero to 15 psi up to about 60 psi.

The pump (60) may be connected to one or more fluid circuits for conveying fluids to the working chamber (16). One of the fluid circuits may be configured and arranged for conveying washing fluids. The same circuit may also convey rinsing fluids or there may be a second fluid circuit for conveying rinsing fluids. The fluids may be provided through connections to existing hot and cold tap water lines.

The machine (10) may also include a device for injecting chemicals into the working chamber (16).

The present invention also provides a method of processing a part produced by a 3-D printer. The method includes providing a housing (13) having a working chamber (16) defined therein. In another step, the method includes providing a support structure (19) disposed at the bottom of the working chamber (16) for supporting the part. The structure (19) may have at least one opening defined therein. Next, the method provides at least one spray header (31) disposed along at least a portion of the perimeter of the working chamber (16). Also, the method includes providing a pump (60) configured and arranged to convey a fluid at varying pressures through the spray header (31).

Next, in a further step, a part is inserted into the working chamber (16). An ultrasonic agitator may be included in the working chamber to assist in removal of debris.

Next, washing fluid is conveyed through the at least one spray header (31) into the working chamber (16).

Also, the method includes conveying rinsing fluid through the at least one spray header (31) into the working chamber (16).

And the method may include filtering fluid from the outlet of the working chamber (16) to remove debris and conveying the filtered fluid to the intake for the pump (60).

DESCRIPTION OF THE EMBODIMENT

Figure 1:
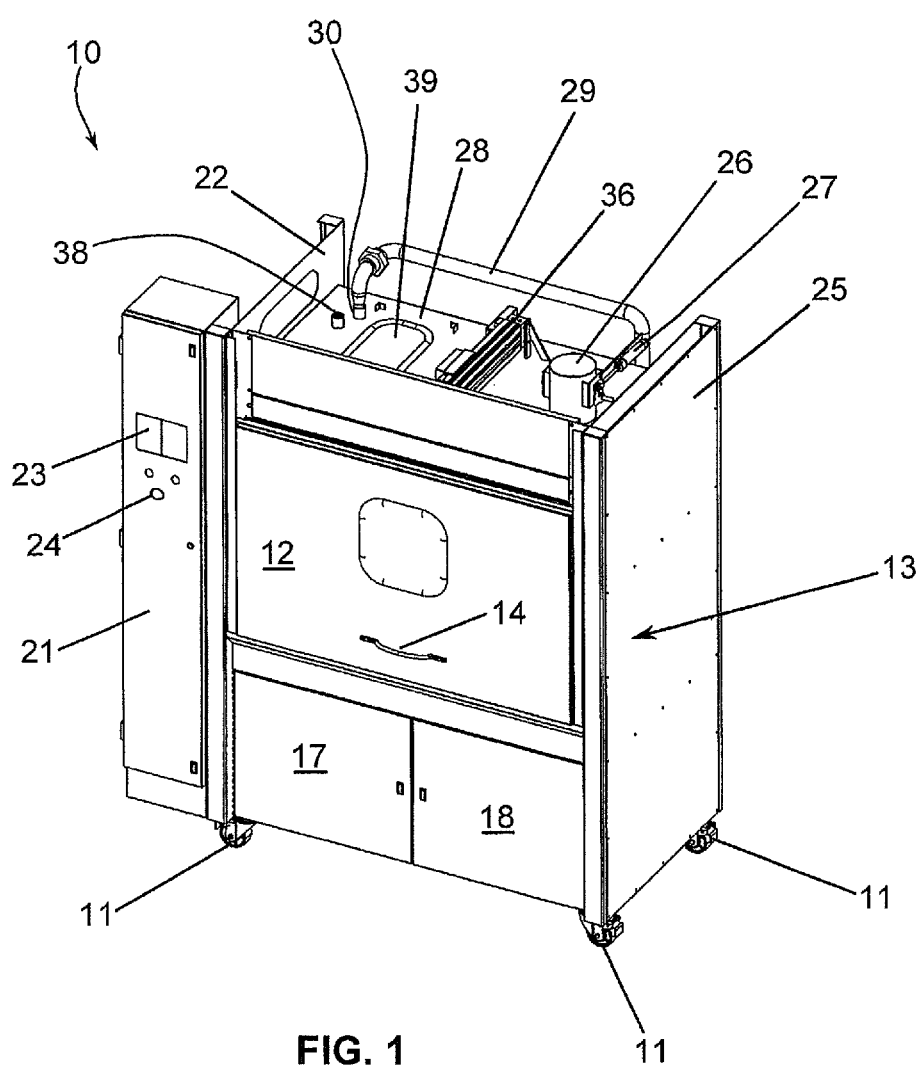
FIG. 1 is a front perspective view of a machine for removing substrate material, for washing, and for drying parts produced by a 3-D printer.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, debris, etc.) together with the specification, and are to be considered a portion of the entire written description of this invention. As used in the following description, the terms "horizontal", "vertical", "left", "right", "up" and "down", as well as adjectival and adverbial derivatives thereof, (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or of rotation, as appropriate.

Figure 2:
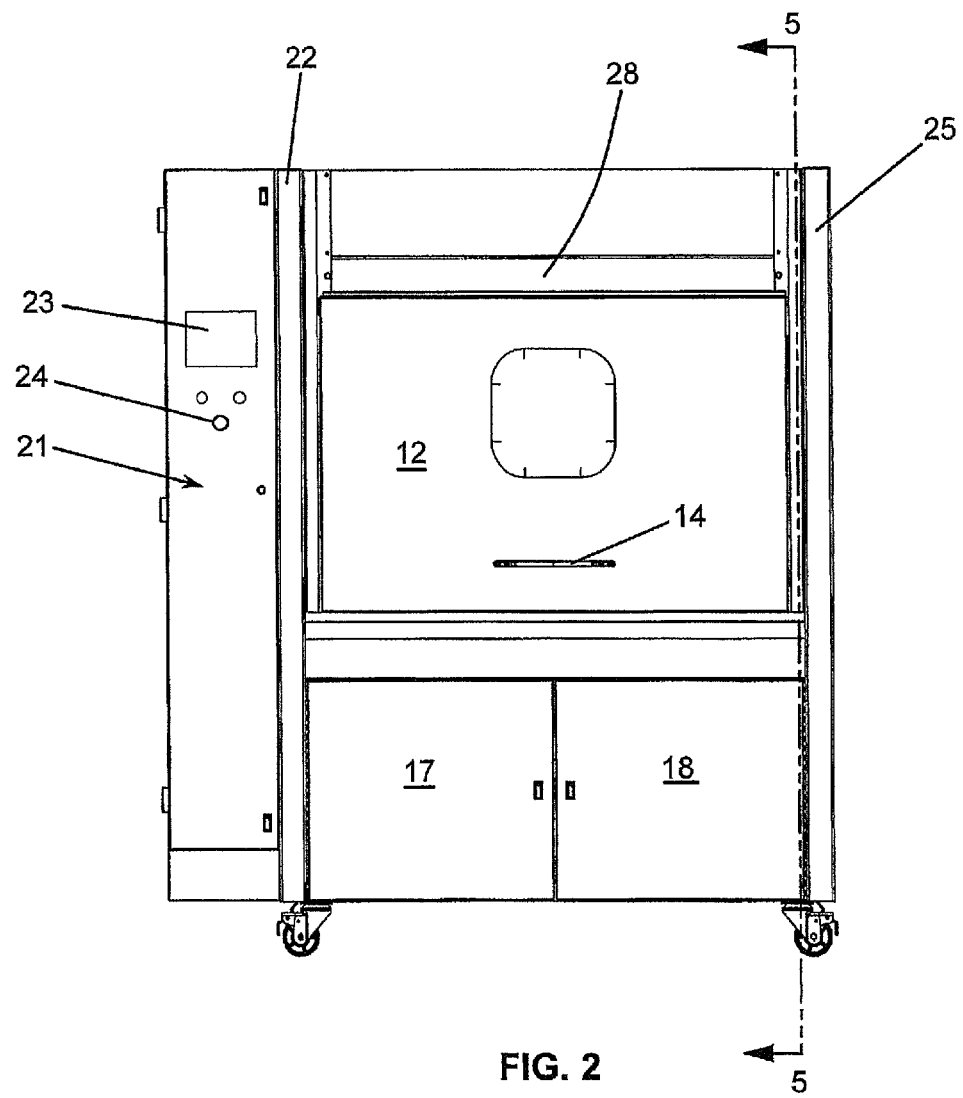
FIG. 2 is a front elevational view of the machine.

Referring to FIGS. 1-7 and initially to FIGS. 1-2, a part produced by a 3-D printer may include a scaffolding and/or substrate attached to the part after the printing process is completed. A finishing process may be required to remove the scaffolding/substrate from the part. Also, parts produced by a 3-D printer may need to be washed and dried. The present invention provides a machine 10 with a housing 13. The machine 10 may be mounted on casters 11 for movement about a support surface. The front of the machine 10 may be provided with a vertically oriented sliding door 12 with a handle 14. As an alternative, a hinged door may be provided. The front of the machine 10 may also be provided with a pair of access doors 17, 18 located beneath the vertical door 12. An electronic enclosure 21 may be located on the left hand side of the machine and may contain electronics and processors for controlling the operation of the machine 10. The electronics may include a programmable logic controller (PLC). The electronic system includes a touch screen display 23 with programmable cycles including programmable startup/shutdown sequencing and time and an emergency stop button 24. The system may also include a status printer. The control system may also include transmitters and receivers for remote connectivity with building automation systems or the like. The housing 13 has a pair of upstanding side members 22 and 25. A top member 28 encloses the top of the housing 13 and provides for mounting fittings for pipes and the spray header drive 36 to the housing 13. The interior of the housing 13 may be illuminated by a light source (not shown). Inlet 30 provides for connection to a conduit 29 that is in fluid communication with the outlet of the pump 60 as described in greater detail herein. A clear window 39 provides for visual inspection of the inside of the working chamber 16. An adjustable exhaust air damper 26 is also provided at the top of the machine and may be actuated to open and close by a rodless cylinder 27.

Figure 3:
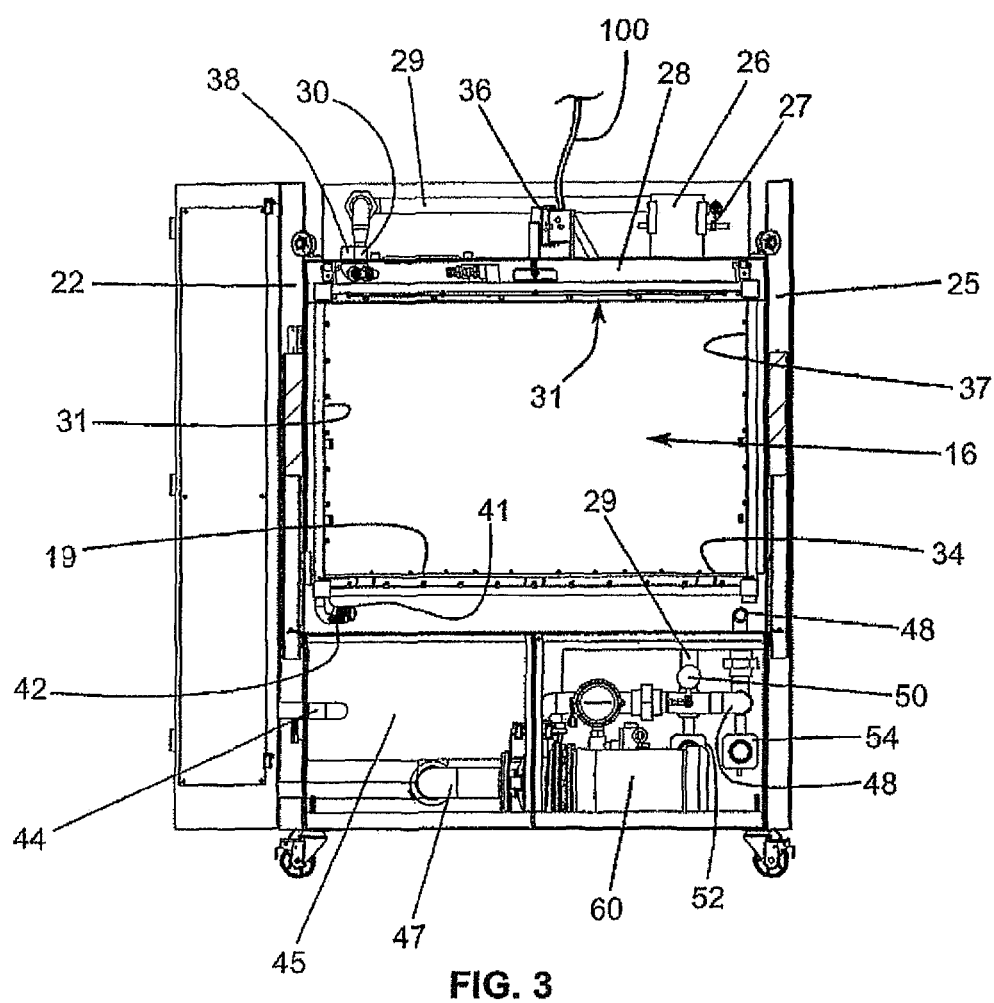
FIG. 3 is a front elevational view of the machine with the front doors and covers removed.

In FIG. 3 an opening or working chamber 16 is located in a midportion of the housing 13. The chamber 16 is bordered at the bottom by a support structure 19. The support structure 19 may be formed by a plurality of members arranged to form an open lattice type structure, or similar structure for drainage. The support structure 19 supports the part being washed and allows fluid and debris to pass through the support structure 19 to a sump 45 below. The chamber 16 is bordered by sidewalls 22, 25 that are spaced apart from each other. The sidewalls 22, 25 are connected by the top wall 28 extending therebetween. A spray header 31 is configured and arranged to extend around the perimeter of the chamber 16. Fluid passes through the chamber 16 to a sump 45 disposed below the chamber 16. The sump 45 has a tube 44 for inserting a level probe. The fluid exits the sump 45 through conduit 47 which is connected to the intake of the pump 60. From the pump 60, fluid is conveyed through conduit 48 to the bottom of the chamber 16, and fluid is conveyed through conduit 29 to the top of the unit. A pressure gauge 50 may be provided to monitor the output pressure of the pump 60. Actuators 52 and 54 control valves disposed in conduits 29 and 48 respectively.

Conduit 48 may be connected to the lower inlet 41 of the spray header 31. Another lower inlet 42 is provided for connection to a water supply or tap water line. Conduit 29 is connected to upper inlet 30 for the spray header 31. Upper inlet 38 may be connected to a water supply or tap water line.

Figure 4:
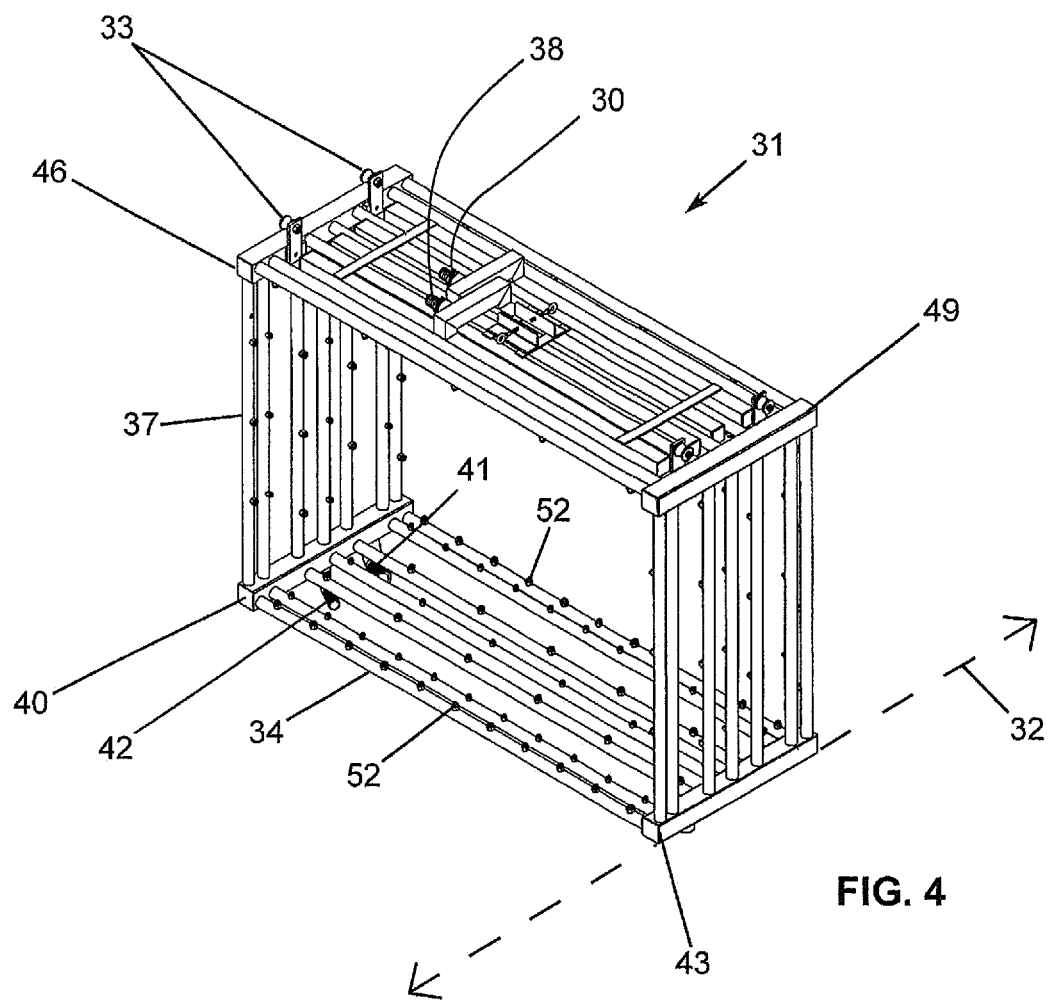
FIG. 4 is a perspective view of a spray header.

Turning to FIG. 4, the spray header 31 may be mounted on a roller carriage 33 for oscillation in the X-axis direction indicated by arrow 32. The spray header 31 may be activated and moved in oscillating fashion pneumatically by means of a spray header drive 36 (FIG. 3) connected to a supply of compressed air 100 (FIG. 3). Other means for causing the spray header 31 to oscillate will be evident to those of ordinary skill in the art based on this disclosure. The spray header 31 may be formed with two or more separate circuits within the header assembly to provide for conveying fluids at different pressures to the working chamber 16. In the example shown, the top of the header 31 receives low pressure fluid and the bottom of the header 31 receivers higher pressure fluid. The pressure of the fluid may be adjusted by varying the size of the nozzles in the individual circuits within the spray header 31.

Figure 5:
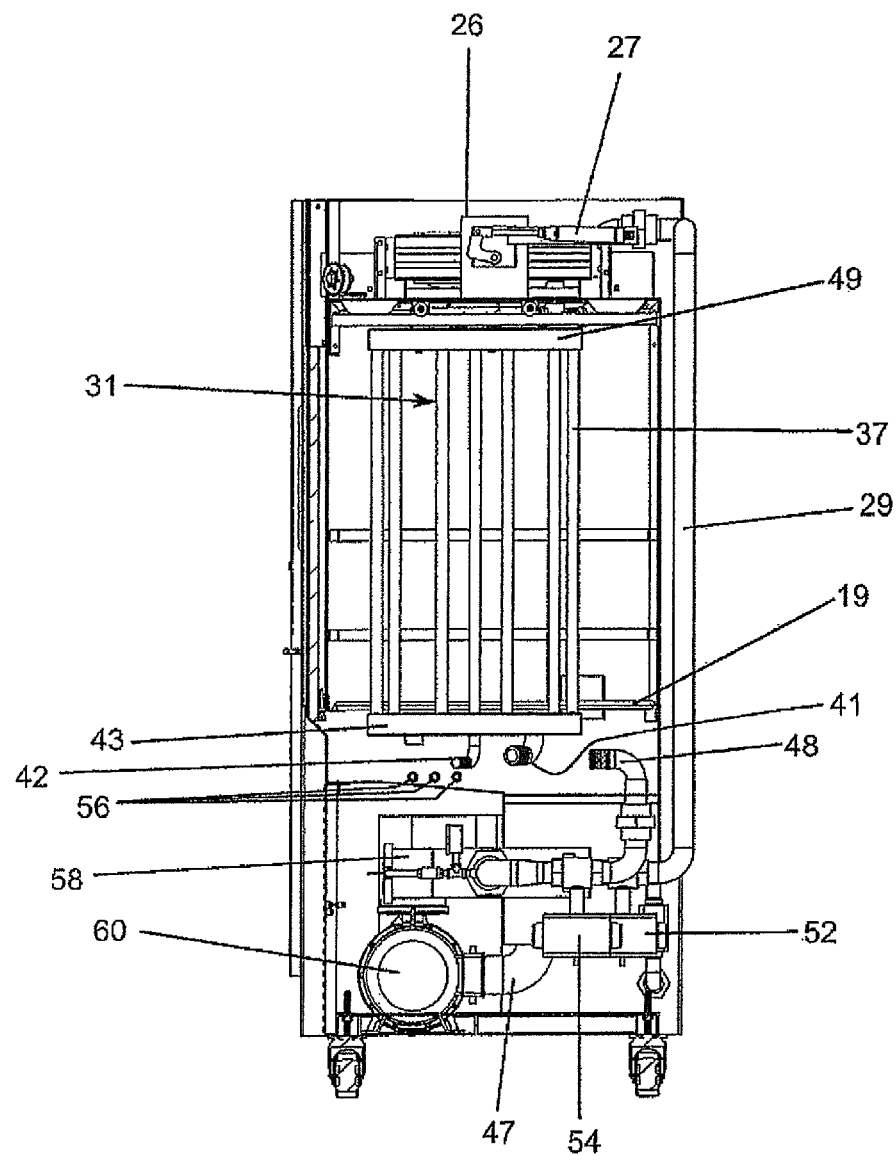
FIG. 5 is a cross-sectional view taken along lines 5-5 of FIG. 2.
Figure 6:
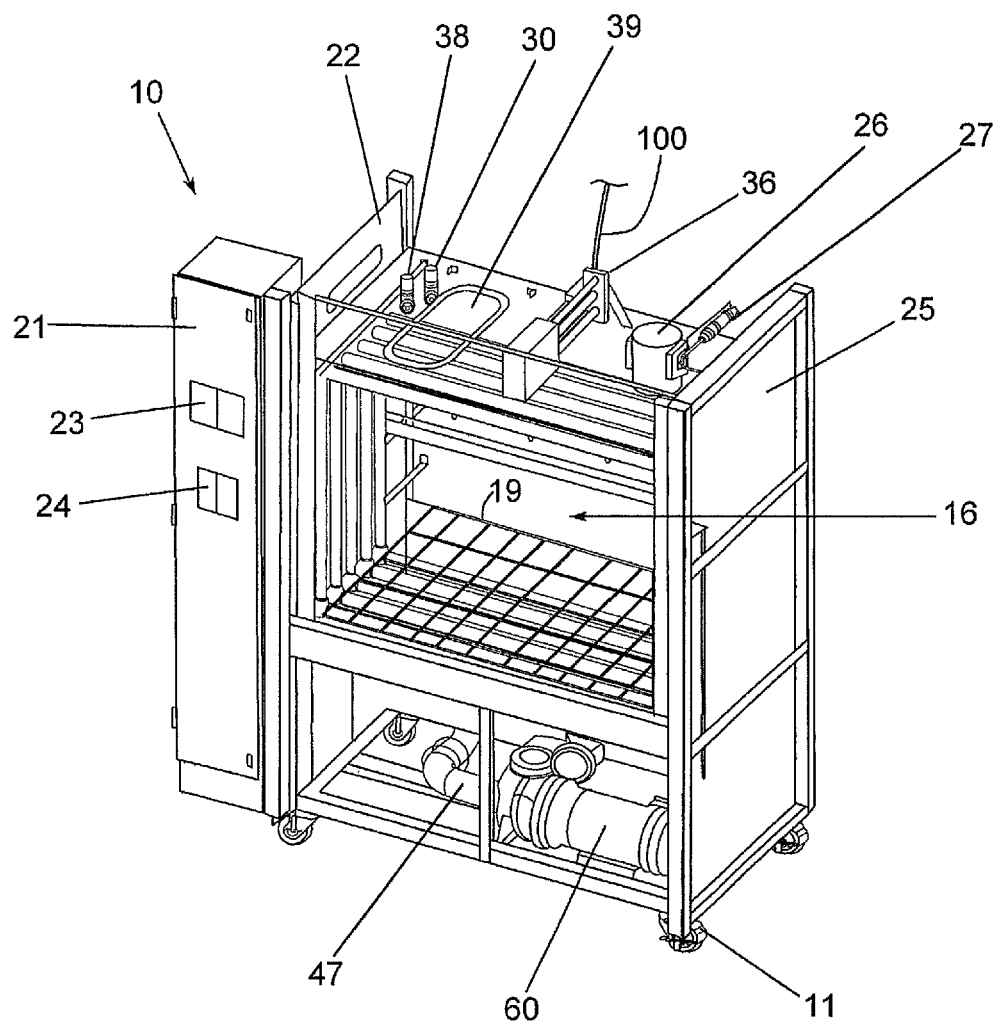
FIG. 6 is a front perspective view of the machine with the doors and covers removed; and, FIG. 7 is a rear perspective view of the machine with the cover removed.

As best shown in FIG. 5, the lower portion of the spray header 31 may be disposed beneath the support structure 19 so that the bottom surface of the part can be sprayed from underneath as it is supported by the support structure 19.

The spray header 31 may include a frame comprised of a plurality of horizontal tubes 34 and a plurality of vertical tubes 37 connected by four header bars 40, 43, 46, 49 to form a generally rectangular structure. Other shapes may also be suitable. Each of the tubes 34 and 37 has a plurality of outlet nozzles 52 defined therein. The tubes 34, 37 and header bars 40, 43, 46, and 49 form a network of fluid conduits for distributing four different fluids. There may be one or more conduits for delivery of the fluids. The high pressure and low pressure wash fluids and the high pressure and low pressure rinse fluids may be conveyed through dedicated circuits or through a common fluid circuit by means of valves.

Figure 7:
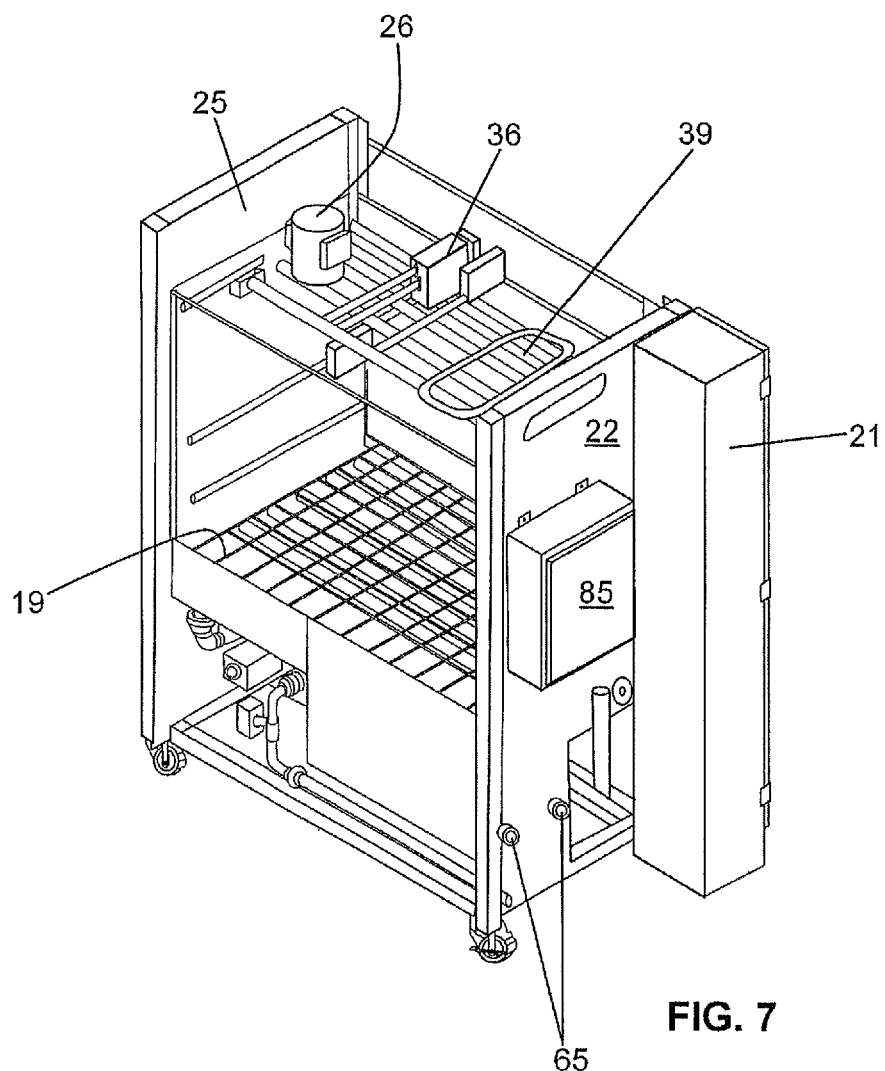

Returning to FIG. 3, the tubes 34 and 37 may contain different circuits for flow of fluids through the system. One of the circuits may contain flow paths for high and low pressure washing cycles. The washing fluid may comprise a mixture of water and chemicals with different ph values, cleaning solution, or the like depending on the material that the part is manufactured from. The washing fluid may be acidic or alkaline as will be evident to those of ordinary skill in the art based on this disclosure. For example, the washing fluid may be heated to a temperature up to approximately 180 degrees F. by an electric heating element 65 (FIG. 7). The washing fluid may be conveyed at varying pressures by a pump 60 (FIG. 5) configured and arranged for variable pressure pumping action. The low pressure range may range from about zero to 15 psi, and the high pressure range may range from about 15 psi to about 60 psi. In the high pressure cycle, the washing fluid is directed into the part from all directions by the spray header 31 to mechanically remove any remnants from the part. In the low pressure cycle, the washing fluid may be delivered at low pressure, or even very low pressure such as a drizzle, to the part to allow the chemical ingredients of the washing fluid to soak and remain in contact with the part for a longer time period. The fluid pressure may also be varied through different size nozzles in the spray header tubes. In addition, to the washing circuits, there may be rinse circuits that provide a passageway for fluids to rinse the part. The rinse fluids may be provided by direct connection to hot and cold water plumbing lines supplied from the plant water supply such as incoming utility water lines. The rinse fluid (e.g. water) may be conveyed at high or low pressure by means of nozzles connected to different flow paths. As an alternative, the wash and rinse fluids may be conveyed through the same flow circuit with the use of different valves. The electric heating element 65 (FIG. 7) may be used for heating the washing fluid to user specified temperatures up to and including approximately 180 degrees F. and to maintain the temperature throughout the wash cycle. The part may be dried by recirculating drying air through the chamber 16 either alone or in connection with a heat exchanger.

In operation, the door 12 (FIG. 1), which may be a guillotine type door, is opened and a part produced by a 3-D printer is inserted for washing, drying, and/or removal of a substrate/scaffold. The door 12 is closed and a wash/rinse cycle is initiated via a computer control system located inside enclosure 21. The control system provides for customizable wash, rinse and heated drying cycles. The control system includes a PLC controller with a HMI touchscreen. The system receives input from pressure, temperature and ph sensors located in the apparatus. The part may be subject to numerous cycles including high pressure washing, low pressure washing, high pressure rinsing, low pressure rinsing, and ultrasonic agitation. The wash cycles may all include a high temperature washing fluid containing chemicals for removing/dissolving the substrate. The control system may also include a wired or wireless remote connection to a building automation system for remote control of the machine.

Turning to FIG. 5, the support structure 19 is shown at the bottom of the chamber 16. The system may include injection ports 56 for injection of chemicals, additives or the like into the chamber 16 for various purposes such as control of the ph of the system or the like. The system may also include a dual frequency ultrasonic agitation system 85 (FIG. 7). Also, the system may be provided with a light for illuminating the interior of the machine. The system may include a high pressure wash circuit (powered by the pump 60). The system may also include a high pressure fresh water rinse circuit (provided by connection to plant tap water supply provided which may be provided by a utility and pressure adjusted by nozzles). The system may also include a low pressure wash circuit (powered by the pump 60) and a low pressure fresh water rinse circuit (provided by connection to plant tap water supply which may be provided by a utility and pressure adjusted by nozzles). The system may also include the following features: oscillating spray header; chemical injection (acid, alkaline, neutralization); automatic PH control; electrically powered heating elements; user programmable cycles (time, pressure, PH, amount of soap, temperature, descale, drain); dual frequency ultrasonic agitation; status printer; touch screen HMI; safety features such as emergency stop button; guide bars; magnetic door switches, load grid, and the like. The machine may also be provided with swivel casters with a brake. Additional features include: 6" exhaust; incoming ¾" hot water feed; incoming ¾" cold water feed; 208/230V/60HZ/3PH OR 220V 2 PH 60 amp service; and 1.5" drain line. The system may include a self-flushing debris strainer 58 (FIG. 5) and a two-stage filtering mechanism in fluid communication with the outlet of the chamber 16. The system may also include an adjustable exhaust air damper 26; a roller carriage for the header drive assembly; submersion tumbling; submersion shelving system; auto-drain; and auto-fill.

Therefore, while the presently-preferred form of machine has been shown and described, and several modifications discussed, persons skilled in this art will readily appreciate that various additional changes may be made without departing from the scope of the invention.

What is claimed is:

1. A method of removing substrate material from a part produced by a 3-D printer, the method comprising:
   providing a housing having a working chamber defined therein;
   providing at least one spray header disposed along at least a portion of the perimeter of the working chamber, the spray header comprising an assembly of vertical and horizontal tubes having apertures defined therein;
   providing a pump configured and arranged to convey a fluid at varying pressures through the spray header;
   inserting the part into the working chamber;
   conveying washing fluid through the at least one spray header into the working chamber to remove the substrate material from the part; and
   conveying rinsing fluid through the at least one spray header into the working chamber.

2. The method of claim 1, further comprising providing a support structure disposed at the bottom of the working chamber for supporting the part, the structure having at least one opening defined therein for the passage of the washing fluid and the rinsing fluid.

3. The method of claim 1, wherein the spray header is disposed around the perimeter of the working chamber.

4. The method of claim 1, wherein the spray header oscillates inside the working chamber.

5. The method of claim 1, wherein the spray header oscillates in the X-axis direction.

6. The method of claim 1, further comprising providing an electric heater for heating the fluids conveyed into the working chamber through the spray header.

7. The method of claim 1, further comprising providing recirculating drying air for drying the part.

8. The method of claim 2, wherein the support structure is an open lattice-type structure.

9. The method of claim 1, wherein the pump is configured to convey the fluids at a low pressure range from zero to 15 psi.

10. The method of claim 1, wherein the pump is configured to convey the fluids at a high pressure range of about 15 psi to about 60 psi.

11. The method of claim 1, further comprising providing a fluid circuit for conveying the washing fluid or the rinsing fluid.

12. The method of claim 1, further comprising providing an ultrasonic agitator disposed in the working chamber to remove debris, the ultrasonic agitator being activated when the part is inserted in the working chamber.

13. The method of claim 1, wherein the spray header has two or more circuits having different size nozzles disposed therein.

14. The method of claim 1, wherein the fluid pressure is varied through sizing of nozzles disposed on the header.

15. A method of removing substrate material from a part produced by a 3-D printer, the method comprising:
   providing a housing having a working chamber defined therein;

providing a support structure disposed at the bottom of the working chamber for supporting the part, the support structure having at least one opening for passage of fluid;

providing a spray header disposed around the perimeter of the working chamber, the spray header comprising a plurality of vertical and horizontal tubes having apertures defined therein, the spray header configured and arranged for oscillating movement inside the working chamber;

providing a pump configured and arranged to convey the fluid at varying pressures through the spray header;

inserting the part into the working chamber;

oscillating the spray header within the working chamber;

wherein the fluid contacts the part to remove the substrate material from the part and then passes through the opening in the support structure where it flows to the bottom of the working chamber to a fluid outlet; and, providing a processor for controlling the cycle times, pressures and temperatures of the fluid conveyed into the working chamber.

16. A method according to claim 15, further comprising providing a heater for heating the fluid conveyed into the working chamber through the spray header.

17. A method according to claim 15, further comprising providing an ultrasonic agitator disposed inside the working chamber to remove debris, and activating the ultrasonic generator when the part is inserted into the working chamber.

18. A method of removing substrate material from a part produced by a 3-D printer, the method comprising:

providing a working chamber for processing the part;

providing a support structure disposed at the bottom of the working chamber for supporting the part, the support structure having at least one opening for passage of fluid;

providing a spray header disposed around the perimeter of the working chamber, the spray header comprising a plurality of vertical and horizontal tubes having apertures defined therein, the spray header configured and arranged for oscillating movement inside the working chamber;

providing an ultrasonic agitator disposed inside the working chamber to remove the substrate material from the 3-D part;

pumping the fluid at varying pressures through the spray header;

inserting the part into the working chamber;

oscillating the spray header within the working chamber, wherein the fluid contacts the part and removes the substrate material from the 3-D part.

19. The method of claim 18, wherein the fluid is conveyed at a low pressure range from zero to 15 psi.

20. The method of claim 18, wherein the fluid is conveyed at a high pressure range of about 15 psi to about 60 psi.

* * * * *